United States Patent [19]
Yamasaki et al.

[11] Patent Number: 5,968,405
[45] Date of Patent: Oct. 19, 1999

[54] COBALT-COATED ACICULAR MAGNETIC IRON OXIDE PARTICLES

[75] Inventors: Minoru Yamasaki, Hiroshima-ken; Katsunori Fujimoto, Yamaguchi-ken; Toshitada Shigemura, Yamaguchi-ken; Katsumi Yamashita, Yamaguchi-ken, all of Japan

[73] Assignee: Toda Kogyo Corporation, Japan

[21] Appl. No.: 08/880,676

[22] Filed: Jun. 23, 1997

[30] Foreign Application Priority Data

Jun. 24, 1996 [JP] Japan ................................. 8-184078

[51] Int. Cl.$^6$ .............................. G11B 5/712; H01F 1/11
[52] U.S. Cl. ..................... 252/62.64; 428/403; 252/62.59
[58] Field of Search ............... 252/62.6, 62.64, 252/62.59, 62.56; 428/403

[56] References Cited

U.S. PATENT DOCUMENTS

| | | | |
|---|---|---|---|
| 4,321,302 | 3/1982 | Umeki et al. | 252/62.56 |
| 5,626,962 | 5/1997 | Yamasaki et al. | 252/62.64 |

FOREIGN PATENT DOCUMENTS

| | | |
|---|---|---|
| 0 671 729 A2 | 9/1995 | European Pat. Off. . |
| 58-19733 | 2/1983 | Japan . |
| 59-98503 | 6/1984 | Japan . |

OTHER PUBLICATIONS

Patent Abstracts of Japan vol. 007, No. 093 (P–192), Apr. 1983 & JP 58 019733 A Tokyo Shibaura Denki KK), Feb. 1983.

Patent Abstracts of Japan, vol. 7, 93, abstract for JP 58–19733, Feb. 4, 1983.

*Primary Examiner*—C. Melissa Koslow
*Attorney, Agent, or Firm*—Nixon & Vanderhye

[57] ABSTRACT

Cobalt-coated acicular magnetic iron oxide particles of the present invention have an average major axial diameter of 0.15 to 0.50 μm, and comprise:

as seed crystal particles, acicular magnetic iron oxide particles containing 0.05 to 1.0 wt % of phosphorus, calculated as P, based on the weight of the cobalt-coated acicular magnetic iron oxide particles;

as inner layers, spinel ferrite layers containing cobalt formed on the surfaces of said seed crystal particles; and as outer layers, coating layers comprising a hydroxide of magnesium formed on said spinel ferrite layers.

Such cobalt-coated acicular magnetic iron oxide particles show a smaller change of coercive force with temperature, have a small switching field distribution and, hence, are suitable as magnetic particles for magnetic recording media.

6 Claims, 2 Drawing Sheets

COBALT-COATED ACICULAR MAGNETIC IRON OXIDE PARTICLES

BACKGROUND OF THE INVENTION

The present invention relates to cobalt-coated acicular magnetic iron oxide particles, and more particularly, to cobalt-coated acicular magnetic iron oxide particles in which a change of coercive force with temperature is small (the temperature dependence of the coercive force is small), which have a small switching field distribution and, hence, which are suitable as magnetic particles for magnetic recording media.

With a development of miniaturized and lightweight magnetic recording and reproducing apparatuses, magnetic recording media such as a magnetic tape and magnetic disk have been increasingly required to have a higher recording density and higher output characteristics.

In order to increase the magnetic recording density, it is necessary that iron oxide particles used are as fine as possible and the iron oxide particles have a high coercive force. This fact is described in, for example, on pages 185 to 187 of the COLLECTED DATA ON MAGNETIC RECORDING MEDIA (1985), published by Synthetic Electronics Research, " . . . The recent technical" innovation is remarkable, . . . higher-density recording has been developed. Therefore, much importance of improving the compactness, light weight and good operability on the basis of the high-density/short-wavelength recording technique in any of audio apparatuses, video apparatuses and floppy disk drives. As the magnetic film coating technique which meets such demand, the ultra-thin coating technique of a surface-smooth film for coating a film to a thickness of 1 to 2 $\mu$m by using fine magnetic particles having a high coercive force, . . . as to a video tape, a high-grade (HG)-type tape using fine magnetic particles were ... in 1982, and as a tape, . . . by using ultrafine magnetic particles, . . . a remarkable improvement in the picture quality will be expected in the near future . . . "Even in the present state, there is no end to a demand for finer magnetic iron oxide particles.

Magnetic recording media are used under various thermal conditions. Especially, data storage tapes for computers are stored in the circumstances in which the temperature changes in a wide range. Such magnetic recording media are required not to lose the data due to the lowering of the coercive force even in a temperature range of 50 to 60° C. There is, therefore, a strong demand for magnetic recording media in which a change of coercive force with temperature is small in a wide temperature range. For this purpose, the magnetic iron oxide particles themselves as a material are required to have a small change of the coercive force with temperature in a wide range.

In order to increase the output of a magnetic recording medium, it is necessary that the S.F.D. (Switching Field Distribution) of the magnetic recording medium is small. This is described in Japanese Patent Application Laid-Open (KOKAI) No. 63-26821 (1988): "FIG. 1 shows the relationship between the S.F.D., and the recording and reproducing output of the above-described magnetic disk . . . . The relationship between the S.F.D., and the recording and reproducing output is linear, as is obvious from FIG. 1, which proves that by using ferromagnetic particles having a small S.F.D. value, the recording and reproducing output enhance. That is, in order to increase the recording and reproducing output, the S.F.D. is preferably as small as possible. In order to obtain a higher output more than the ordinary one, it is necessary that the S.F.D. is not more than 0.6." For this purpose, magnetic iron oxide particles are required to have a width of the distribution of the coercive force as small as possible.

Various attempts have been made at producing acicular magnetic iron oxide particles to contain or coat various compounds in order to improve the properties thereof. There are, for example, a method of obtaining acicular magnetite particles by adding a phosphate to an aqueous suspension of acicular ferric oxide hydroxide particles to obtain acicular ferric oxide hydroxide particles with the phosphate adsorbed thereto, filtering, drying, heating, dehydrating and reducing the thus-obtained particles by an ordinary method (Japanese Patent Publication Nos. 55-6577 (1980) and 58-54487 (1983), and Japanese Patent Application Laid-Open (KOKAI) No. 57-113202 (1982)), a method of coating acicular magnetite particles with cobalt which are obtained by producing Si-containing goethite particles by the growth reaction of goethite seed crystals in the presence of Si, and reducing the goethite particles by an ordinary method (Japanese Patent Application Laid-Open (KOKAI) No. 5-335126 (1983)), a method of dissolving a magnesium salt in the aqueous dispersion of Co-coated magnetic iron oxide particles and then adding an alkali hydroxide so as to adhere the thus-produced magnesium hydroxide to the surface of the magnetic iron oxide particles (Japanese Patent Publication No. 62-50889 (1987)), a method of re-pulping a cake obtained by filtering and washing Co-coated magnetic iron oxide particles into a slurry, and adding an aqueous solution a magnesium salt so as to coat the surfaces of the particles with a hydroxide of magnesium ((Japanese Patent Publication No. 2-30563 (1990)), and a method of adding a magnesium salt to the washing water for washing the alkaline slurry of maghemite particle denatured by cobalt (Japanese Patent Application Laid-Open (KOKAI) No. 1-184801 (1989)).

More specifically, the method described in Japanese Patent Publication No. 55-6577 (1980) is a method of producing magnetic iron oxide particles as magnetic recording materials, comprising the steps of: producing acicular ferric oxide hydroxide particles by a wet reaction between a solution of a ferrous salt and an alkali; filtering the acicular ferric oxide hydroxide particles from the mother liquor and washing with water; suspending the particles in water; adding 0.1 to 2 wt % (calculated as $PO_3$) of a phosphate to the ferric oxide hydroxide particles when the pH of the suspension is not less than 6 so as to disperse the acicular ferric oxide hydroxide particles; adjusting the pH of the suspension to 3 to 5; filtering out and drying the acicular ferric oxide hydroxide particles; and dehydrating under heating and reducing the acicular ferric oxide hydroxide particles by an ordinary method so as to produce acicular magnetite particles.

The method described in Japanese Patent Publication No. 58-54487 (1983) is a method of producing acicular magnetic iron oxide particles as magnetic recording materials, comprising the steps of: producing acicular ferric oxide hydroxide particles by a wet reaction between a solution of a ferrous salt and an alkali; adding 0.1 to 15 wt % (calculated as $PO_3$ based on ferric oxide hydroxide particles) of a phosphate to the mother liquor after the end of the reaction; stirring the suspension; filtering out the acicular ferric oxide hydroxide particles; washing with water and drying; and dehydrating under heating and reducing the acicular ferric oxide hydroxide particles by an ordinary method so as to produce acicular magnetite particles.

The method described in Japanese Patent Application Laid-Open (KOKAI) No. 57-113202 (1982) is a method of producing acicular iron oxyhydrate fine particles, comprising the step of coating acicular magnetic iron oxide particles with a metal phosphate compound in the ratio of 0.05/100 to 5/100 as P/Fe.

The method described in Japanese Patent Application Laid-Open (KOKAI) No. 5-335126 (1993) is a method of producing acicular magnetic iron oxide particles, comprising the steps of passing oxygen-containing gas in a suspension of not less than pH 11 containing ferrous hydroxide which is obtained by reacting an aqueous ferrous salt solution with an aqueous alkali on conditions that spindle-shaped goethite particles are present as seed crystals either in the aqueous ferrous salt solution or in the suspension containing the ferrous hydroxide and before passing the gas, and that 0.2 to 5.0 atm % of an Si compound calculated as Si/Fe based on the total iron is added so as to produce acicular goethite particles by growing the seed crystals; and reducing the acicular goethite particles or the acicular hematite particles obtained by heating the acicular goethite particles at 300 to 700° C., under heating in a reducing gas so as to obtain acicular magnetite particles; or further oxidizing the acicular magnetite particles so as to obtain maghemite particles.

The method described in Japanese Patent Publication No. 62-50889 (1987) is a method of producing a magnetic recording medium comprising the steps of: mixing at least one ferromagnetic particles selected from the group consisting of tri-iron tetroxide, γ-ferrite, cobalt-treated γ-ferrite, iron, iron-cobalt alloy, cobalt-chrome alloy and chrome oxide, a binder resin, an oxide and/or a hydroxide of at least one selected from the group consisting of magnesium, calcium, strontium, barium, zinc, cadmium, aluminum, gallium, yttrium and lead, and water, if necessary; and molding the mixture or applying the mixture to a nonmagnetic substrate.

The method described in Japanese Patent Application Laid-Open (KOKAI) No. 1-184801 (1989) is a method of producing magnetic iron oxide particles for magnetic recording, comprising the steps of: adding at least one selected from the group consisting of magnesium salt, calcium salt, strontium salt and barium salt to at least one selected from the group consisting of an alkaline slurry containing cobalt-modified γ-iron oxide which is obtained by modifying γ-iron oxide particles with cobalt in an aqueous alkaline solution, and water; and washing the alkaline slurry with the water.

Although cobalt-coated acicular magnetic iron oxide particles which are capable of suppressing a change of coercive force with temperature as much as possible and which have a small switching field distribution (S.F.D.), are now in the strongest demand, the known magnetic iron oxide particles described above cannot be said to sufficiently meet such demand.

More specifically, in any of the methods of producing magnetic iron oxide particles described in Japanese Patent Publication Nos. 55-6577 (1980) and 58-54487 (1983), and Japanese Patent Application Laid-Open (KOKAI) No. 57-113202 (1982), there is no process after the cobalt coating step. Therefore, the particles are not coated with a hydroxide of Mg, and as a result, the effect on the improvement of the switching field distribution (S.F.D.) and the improvement of a change of coercive force with temperature is not sufficient.

Similarly, in the method of producing magnetic iron oxide particles described in Japanese Patent Application Laid-Open (KOKAI) No. 5-335126 (1993), since the particles are not coated with a hydroxide of Mg after the cobalt coating, the effect on the improvement of a change of coercive force with temperature is not sufficient.

In the method of producing magnetic iron oxide particles described in Japanese Patent Publication Nos. 62-50889 (1987) and 2-30563 (1990) and Japanese Patent Application Laid-Open (KOKAI) No. 1-184801 (1989), since seed crystals containing P are not used at the time of coating the particles with cobalt as seed crystal particles, the effect on the improvement of the switching field distribution (S.F.D.) and the improvement of a change of coercive force with temperature is not sufficient.

Accordingly, the technical subject of the present invention is to solve the above-described problems and to produce cobalt-coated acicular magnetic iron oxide particles in which a change of coercive force with temperature is as small as possible and the switching field distribution (S.F.D.) is as smaller as possible, and therefore which are suitable for magnetic recording media.

As a result of studies undertaken by the present inventors, it has been found that in cobalt-coated acicular magnetic iron oxide particles produced by preparing acicular magnetite particles or acicular maghemite particles containing 0.05 to 1.00 wt % of phosphorus (calculated as P) and, if necessary, 0.05 to 1.00 wt % of an oxide of silicon (calculated as Si) as seed crystal particles; forming spinel ferrite layers containing cobalt on the surfaces of the seed crystal particles by heat-aging a mixed solution of an aqueous suspension containing the above-mentioned seed crystal particles, an aqueous alkali solution and a cobalt salt, or a mixed solution of an aqueous suspension containing the above-mentioned seed crystal particles, an aqueous alkali solution, a cobalt salt and a ferrous salt; adding a magnesium salt in the aqueous suspension containing the particles obtained; and adjusting the pH of the aqueous suspension to 7.5 to 10.5 so as to form magnesium hydroxide layers on the surfaces of the particles, a change of coercive force with temperature is small (the temperature dependence of the coercive fore is small) and the switching field distribution (S.F.D.) is small, so that the cobalt-coated acicular magnetic iron oxide particles are suitable as magnetic particles for magnetic recording media. The present invention has been achieved on the basis of this finding.

SUMMARY OF THE INVENTION

It is an object of the present invention to provide cobalt-coated acicular magnetic iron oxide particles in which a change of coercive force with temperature is small (the temperature dependence of the coercive force is small), which have a small switching field distribution and, hence, which are suitable as magnetic particles for magnetic recording media.

To accomplish the aim, in a first aspect of the present there are provided cobalt-coated acicular magnetic iron oxide particles having an average major axial diameter of 0.15 to 0.50 μm, and comprising:

as seed crystal particles acicular, magnetic iron oxide particles containing 0.05 to 1.0 wt % of phosphorus (calculated as P) based on the weight of the cobalt-coated acicular magnetic iron oxide particles;

as inner layers, spinel ferrite layers containing cobalt formed on the surfaces of the seed crystal particles; and as outer layers, coating layers comprising a hydroxide of magnesium formed on the surfaces of the spinel ferrite layers.

In a second aspect of the present invention, there are provided cobalt-coated acicular magnetic iron oxide particles having an average major axial diameter of 0.15 to 0.50 μm, and comprising:

as seed crystal particles acicular, magnetic iron oxide particles containing 0.05 to 1.0 wt % of phosphorus (calculated as P) based on the weight of the cobalt-coated acicular magnetic iron oxide particles and 0.05 to 1.0 wt % of an oxide of silicon (calculated as Si) based on the weight of the cobalt-coated acicular magnetic iron oxide particles;

as inner layers, spinel ferrite layers containing cobalt formed on the surfaces of the seed crystal particles; and as outer layers, coating layers comprising a hydroxide of magnesium formed on the surfaces of the spinel ferrite layers.

DETAILED DESCRIPTION OF THE INVENTION

The cobalt-coated acicular magnetic iron oxide particles according to the present invention will first be described.

The cobalt-coated acicular magnetic iron oxide particles according to the present invention have an average major axial diameter of 0.15 to 0.50 μm.

If the average major axial diameter is less than 0.15 μm, the dispersibility in a binder resin during the production of a magnetic recording medium is poor and it takes a long time to uniformly disperse particles in the resin, which remarkably deteriorates the productivity. On the other hand, if the average major axial diameter exceeds 0.50 μm, a magnetic recording medium produced therefrom is not suitable for high-density recording and short-wavelength recording.

The aspect ratio (major axial diameter/minor axial diameter) is preferably large, especially not less than 5, more preferably not less than 6. The upper limit of the aspect ratio (major axial diameter/minor axial diameter) is preferably about 8.

If the aspect ratio is less than 5, it may be difficult to obtain an adequate squareness when the particles are produced into a magnetic recording tape, so that it may be difficult to obtain the intended output characteristics.

The cobalt-coated acicular magnetic iron oxide particles according to the present invention have a specific surface area of usually 25 to 50 m²/g, preferably 30 to 45 m²g. If the specific surface area is less than 25 m²/g, a magnetic recording medium produced therefrom may be unsuitable for high-density recording and short-wavelength recording. If the specific surface area exceeds 50 m²/g, the dispersibility in a binder resin during the production of a magnetic recording medium is poor and it takes a long time to uniformly disperse particles in the resin, which remarkably lowers the productivity.

The cobalt-coated acicular magnetic iron oxide particles according to the present invention contain phosphorus in seed crystal particles constituted by acicular magnetic iron oxide particles. The seed crystal particle has a spinel ferrite layer as an inner layer and a coating layer of a hydroxide of magnesium as an outer layer on the surface thereof.

The seed crystals containing phosphorus or phosphorus and an Si compound in the present invention may be either acicular magnetite particles ($FeO_x Fe_2O_3$, $0<x\leq 1$) or acicular maghemite particles ($\gamma$-$Fe_2O_3$).

The seed crystals constituted by acicular magnetic iron oxide particles in the present invention contain 0.05 to 1.0 wt %, preferably 0.05 to 0.5 wt % of phosphorus (calculated as P) based on the weight of the cobalt-coated acicular magnetic iron oxide particles. If the content of phosphorus is less than 0.05 wt %, it is impossible to produce the effect of suppressing a change of coercive force with temperature and to reduce the switching field distribution (S.F.D.). If the content exceeds 1.0 wt %, it is feared that the magnetic characteristics such as saturation magnetization may be deteriorated.

The cobalt-coated acicular magnetic iron oxide particles of the present invention contain usually 1.0 to 10.0 wt %, preferably 1.5 to 5.0 wt % of cobalt (calculated as Co) based on the weight of the cobalt-coated acicular magnetic iron oxide particles, in the spinel ferrite layers ($Co_{1-x}Fe_xO\cdot Fe_2O_3$, $0\leq x<1$) as the inner layers. If the Co content is less than 1.0 wt %, it may be difficult to obtain a sufficiently high coercive force and the magnetic stability with passage of time is lowered. If the Co content exceeds 10.0 wt %, although a sufficiently high coercive force is not economically advantageous.

The cobalt-coated acicular magnetic iron oxide particles of the present invention contain 0.01 to 1.0 wt %, preferably 0.1 to 0.5 wt % of magnesium (calculated as Mg) based on the weight of the cobalt-coated acicular magnetic iron oxide particles in the coating layers constituted by a hydroxide of magnesium as the outer layers. If the Mg content is less than 0.01 wt %, it may be difficult to produce the effect of suppressing a change of coercive force with temperature and to reduce the switching field distribution (S.F.D.). If the content exceeds 1.0 wt %, it is feared that the magnetic characteristics such as saturation magnetization may be deteriorated.

The coercive force of the cobalt-coated acicular magnetic iron oxide particles of the present invention at 25° C. is in the range of 650 to 1600 Oe, preferably 670 to 1000 Oe. The saturation magnetization thereof is in the range of 77 to 90 emu/g, preferably 80 to 90 emu/g.

The percentage of change of coercive force with temperature: $\delta Hc/(\delta Txc$ (25° C.) is $-2.92\times 10^{-3}$ to 0/° C., preferably $-2.90\times 10^{-3}$ to 0/° C.

The switching field distribution (S.F.D.) of a magnetic sheet produced by using the cobalt-coated acicular magnetic iron oxide particles of the present invention is not more than 0.460, preferably not more than 0.455.

In the cobalt-coated acicular magnetic iron oxide particles of the present invention, the seed crystal particles composed of acicular magnetic iron oxide particles further contain, if necessary, usually not more than 1.0 wt %, preferably 0.05 to 1.0 wt %, more preferably 0.05 to 0.5 wt % of oxide of silicon (calculated as Si) based on the weight of the cobalt-coated acicular magnetic iron oxide particles.

When the seed crystals contain a predetermined amount of oxide of silicon, a change of coercive force with temperature is suppressed, and the switching field distribution (S.F.D.) is reduced. Furthermore, since the shapes of acicular goethite particles as the raw material of the seed crystal particles are retained, it is possible to produce acicular magnetic iron oxide particles having a large aspect ratio.

The process for producing the cobalt-coated acicular magnetic iron oxide particles according to the present invention will now be described.

The cobalt-coated acicular magnetic iron oxide particles according to the present invention are produced by preparing acicular magnetite particles or acicular maghemite particles containing 0.05 to 1.00 wt % of phosphorus (calculated as P) and, if necessary, 0.05 to 1.00 wt % of an oxide of silicon (calculated as Si) based on the weight of the cobalt-coated acicular magnetic iron oxide particles as seed crystal particles; forming spinel ferrite layers containing cobalt on the surfaces of the seed crystal particles by heat-aging a mixed solution of an aqueous suspension containing the seed crystal particles, an aqueous alkali solution and a cobalt salt or a mixed solution of an aqueous suspension containing the seed crystal particles, an aqueous alkali solution, a cobalt salt and a ferrous salt; adding a magnesium salt in the aqueous suspension containing the particles obtained; and adjusting the pH of the aqueous suspension to 7.5 to 10.5 so as to form magnesium hydroxide layers on the spinel ferrite layer.

The acicular magnetite particles or acicular maghemite particles containing 0.05 to 1.00 wt % of phosphorus (calculated as P) and, if necessary, 0.05 to 1.00 wt % of an oxide of silicon (calculated as Si) based on the weight of the cobalt-coated acicular magnetic iron oxide particles as seed crystal particles are obtained by adding a predetermined amount of phosphate or phosphate and water-soluble silicate to one selected from the group consisting of an aqueous ferrous salt solution, an aqueous alkali solution and a mixed solution thereof; producing acicular goethite particles by passing an oxygen-containing gas in the mixed solution of the aqueous ferrous salt solution and the aqueous alkali solution for oxidation; and reducing the acicular goethite particles or the acicular hematite particles obtained by heating the acicular goethite particles, under heating so as to obtain acicular magnetite particles. If it is necessary, the acicular magnetite particles obtained are further oxidized under heating so as to obtain maghemite particles. In place of adding phosphate or phosphate and water-soluble silicate to one of the above-described aqueous solutions, a predetermined amount of phosphate or phosphate and water-soluble silicate may be added to aqueous suspension containing the acicular goethite particles or the aqueous suspension containing the acicular hematite particles so as to coat the particle surfaces.

As the aqueous ferrous salt solution used for the production of the acicular goethite particles, an aqueous ferrous sulfate solution, an aqueous ferrous chloride solution, etc. are usable.

As the aqueous alkali solution used for the production of the acicular goethite particles, an aqueous alkali hydroxide such as aqueous sodium hydroxide and aqueous potassium hydroxide, and an aqueous alkali carbonate such as aqueous sodium carbonate, aqueous potassium carbonate and aqueous ammonium carbonate are usable.

The oxidation in the production of the acicular goethite particles is carried out by passing an oxygen-containing gas such as air in to the liquid such as the mixed solution, and if necessary, the solution may be stirred by mechanically or in other ways. The temperature for the oxidation is preferably 25 to 65° C.

The acicular hematite particles are obtained by heating the acicular goethite particles at 300 to 800° C., preferably at 350 to 700° C.

The acicular magnetite particles are obtained by reducing the acicular goethite particles or the acicular hematite particles under heating at 300 to 500° C., preferably 300 to 400° C. in a hydrogen-containing atmosphere.

The acicular maghemite particles are obtained by oxidizing the acicular magnetite particles at 200 to 400° C., preferably 250 to 350° C. in an atmosphere of an oxygen-containing gas.

Examples of the phosphate added other than phosphoric acid ($H_3PO_4$) are alkali metal salts such as potassium phosphate, potassium phosphite, potassium hypophosphite, sodium phosphate, sodium phosphite, sodium hypophosphite and sodium metaphosphate, and alkali earth metal salts such as calcium phosphate and strontium phosphate.

The phosphoric acid or phosphate is added so that the content of the phosphorus becomes 0.05 to 1.00 wt %, preferably 0.07 to 0.50 wt % (calculated as P) based on the weight of the cobalt-coated acicular magnetic iron oxide particles. If it is less than 0.05 wt %, it is impossible to obtain the magnetic iron oxide particles as the target of the present invention in which a change of coercive force with temperature is suppressed and the switching field distribution (S.F.D.) is small. If it exceeds 1.00 wt %, the magnetic characteristics are disadvantageously deteriorated.

As the water-soluble silicate added, water glass, sodium silicate, potassium silicate, calcium silicate, etc. are usable.

The water-soluble silicate is added so that the content of the oxide of silicon becomes 0.05 to 1.00 wt %, preferably 0.07 to 0.50 wt % (calculated as Si) based on the weight of the cobalt-coated acicular magnetic iron oxide particles. If it is less than 0.05%, the shape retaining effect during heating is not obtained. If it exceeds 1.00 wt %, the magnetic characteristics are disadvantageously deteriorated.

The seed crystal particles have a major axial diameter of 0.10 to 0.4 μm, and a large aspect ratio (major axial diameter/minor axial diameter), that is, usually not less than 4, preferably not less than 5, more preferably not less than 7. The shape of a seed crystal may be a spindle shape, a strip shape, a grain shape as well as an acicular shape.

The BET specific surface area of the seed crystal particles is 25 to 50 m$^2$/g, preferably 30 to 45 m$^2$/g.

The coercive force of the seed crystal particles is in the range of 650 to 1000 Oe, preferably 670 to 1000 Oe. The saturation magnetization is in the range of 77 to 90 emu/g, preferably 80 to 90 emu/g.

The cobalt coating reaction of the present invention is carried out by the following known methods.

(1) A method of modifying acicular maghemite particles with Co, comprises dispersing the acicular maghemite particles in water containing an aqueous solution of a cobalt salt, adding a caustic alkali to the suspension raising the temperature to 50 to 100° C., and maintaining the suspension at that temperature, as described in Japanese Patent Publication No. 52-24238 (1977).

(2) A method of modifying acicular maghemite particles with a ferrous salt and Co, comprises dispersing the acicular maghemite particles in a mixed aqueous solution of a ferrous salt and a cobalt salt, adding a caustic alkali to the suspension, raising the temperature to 50 to 100° C., and maintaining the suspension at that temperature, as described in Japanese Patent Publication No. 52-36751 (1977).

(3) A method of modifying acicular magnetite particles with Co, comprises dispersing the acicular magnetite particles in water containing an aqueous solution of a cobalt salt, adding a caustic alkali to the suspension raising the temperature to 50 to 100° C., and maintaining the suspension at that temperature, as described in Japanese Patent Publication No. 52-24237 (1977).

(4) A method of modifying acicular magnetite particles with a ferrous salt and cobalt, comprises dispersing the acicular magnetite particles in a mixed aqueous solution of a ferrous salt and a cobalt salt, adding a caustic alkali to the suspension, raising the temperature to 50 to 100° C., and maintaining the suspension at the temperature, as described in Japanese Patent Publication No. 52-36863 (1977).

As the aqueous alkali solution used for the cobalt coating reaction, an aqueous alkali hydroxide such as aqueous sodium hydroxide and aqueous potassium hydroxide, and an aqueous alkali carbonate such as aqueous sodium carbonate, aqueous potassium carbonate and aqueous ammonium carbonate are usable.

As the cobalt salt used in the cobalt coating reaction for forming spinel ferrite layers containing cobalt, cobalt sulfate, cobalt chloride, etc. are usable as they are or in the form of an aqueous solution.

The cobalt salt is added so that the Co content in the spinel ferrite layer as the inner layer becomes 1.0 to 10.0 wt %, preferably 1.5 to 5.0 wt % (calculated as Co) based on the weight of the cobalt-coated acicular magnetic iron oxide particles. Concretely, the amount of the Co salt added is usually 1.0 to 15 wt %, preferably 1.5 to 7.5 wt % (calculated as Co) based on the weight of the seed crystal particles. Incidentally, the approximately entire amount of Co in cobalt salt added is present as a Co-containing spinel ferrite formed on the surface of the seed crystal particles.

It is possible to add an aqueous ferrous salt, if necessary, in the cobalt coating reaction. As the aqueous ferrous salt, an aqueous ferrous sulfate, an aqueous ferrous chloride, etc. are usable.

After the end of the cobalt coating reaction, magnesium hydroxide layers are formed.

The layer composed of hydroxide of magnesium is formed by adding a magnesium salt to an aqueous suspension containing the seed crystal particle coated with the spinel ferrite layer containing cobalt, and adjusting the pH to 7.5 to 10.5.

As the aqueous suspension, the aqueous suspension after the cobalt coating reaction which contains the seed crystal particles coated with the spinel ferrite layers containing cobalt is usable as it is. The aqueous suspension after the cobalt coating reaction may be diluted and washed by decantation or the like before it is used. Alternatively, the aqueous suspension after the cobalt coating reaction may be filtered and washed with water to obtain a wet cake, and an aqueous suspension obtained by re-pulping the wet cake may be used. The wet cake may be dried and thereafter re-dispersed.

The concentration of the aqueous suspension is preferably 10 to 300 g/liter. If the concentration is as low as less than 10 g/liter, the productivity is unfavorable. On the other hand, if the concentration is as high as more than 300 g/liter, it is difficult to form a uniform coating layer composed of a hydroxide of magnesium.

The temperature of the aqueous suspension is preferably 60 to 100° C., more preferably 80 to 100° C. The concentration of hydroxyl group (OH$^-$) is preferably 0.8 to 3.0 mol/liter, more preferably 1.0 to 2.5 mol/liter.

As the magnesium salt added, magnesium sulfate particles, magnesium chloride particles, magnesium nitrate particles, etc. are usable as they are or in the form of an aqueous solution. In order to disperse swiftly and uniformly, the particles are preferably added in the form of an aqueous solution. The magnesium salt is added so that the Mg content in the outer layer composed of the hydroxide of magnesium becomes in the range of usually 0.01 to 1.20 wt %, preferably 0.1 to 0.5 wt % (calculated as Mg) based on the weight of the cobalt-coated acicular magnetic iron oxide particles. Concretely, the amount of the magnesium salt added is usually 0.033 to 3.3 wt %, preferably 0.33 to 1.65 wt % (calculated as Mg) based on the weight of the seed crystal particles. Incidentally, the approximately, entire amount of Mg in the magnesium salt is deposited on the surface of the Co-containing spinel ferrite layer.

The temperature of the aqueous suspension when a magnesium salt is added is in the range of usually 30 to 100° C., preferably 50 to 100° C. If the temperature is lower than 30° C., the amount of magnesium salt adsorbed to the particle surfaces is reduced. If the temperature is exceeds 100° C., it is difficult to form a uniform coating layer on the surface of the Co-containing spinel ferrite layer and, in addition, an apparatus such as an autoclave is required, which is industrially disadvantageous.

The stirring time is preferably selected from the range of 30 to 900 minutes. If it is less than 30 minutes, the adsorption of magnesium may be insufficient. Stirring for more than 900 minutes may be industrially disadvantageous. The range of 60 to 600 minutes is favorable in practical use.

Thereafter, the pH of the aqueous suspension containing the magnesium salt is adjusted to a range of usually 7.5 to 10.5, preferably 9 to 10.5, and after the coating layers composed of a hydroxide of magnesium are formed, the particles are washed with water. If the pH is less than 7.5, the coercive force Hc which is enhanced by coating the particles with cobalt may be reduced. If the pH exceeds 10.5, a large amount of soluble salt may remain and exert a deleterious influence on the dispersibility of the particles in a vehicle at the time of producing a magnetic recording medium or on the magnetic characteristics of the magnetic recording medium produced.

After the particles are washed with water, an ordinary method may be adopted for the treatment such as filtration and drying.

What is the most important in the present invention is the fact that when the seed crystals comprising acicular magnetic iron oxide particles containing a predetermined amount of P are coated with cobalt, and then with coating layers comprising a hydroxide of magnesium, it is possible to produce cobalt-coated acicular magnetic iron oxide particles in which a change of coercive force with temperature is suppressed and the switching field distribution (S.F.D.) is small.

The reason why it is possible to reduce the percentage of change of coercive force with temperature: $\delta Hc/(\delta T \times Hc$ (25° C.)) and the switching field distribution (S.F.D.) in the present invention, is considered as follows. Since it is difficult to suppress a change of coercive force with temperature and the switching field distribution is large when the seed crystal particles containing a predetermined amount of P are not coated with coating layers comprising a hydroxide of magnesium, or when the seed crystal particles having coating layers comprising a hydroxide of magnesium do not contain P, as will be shown in the later-described comparative examples, the technical advantages of the present invention has been attained by a synergistic effect of the use of acicular magnetic iron oxide particles containing a predetermined amount of P for the cobalt coating reaction and the formation of coating layers comprising a hydroxide of magnesium after the acicular magnetic iron oxide particles are coated with cobalt.

When the seed crystal particles contain P and Si, it is possible to retain the shapes of acicular goethite particles as a material while maintaining the synergistic effect, and to produce particles having a large aspect ratio. Consequently, it is possible to produce acicular magnetic iron oxide particles having a more excellent orientation.

Since a change of coercive force with temperature is suppressed and the switching field distribution (S.F.D.) is small, the cobalt-coated acicular magnetic iron oxide particles according to the present invention are suitable as a magnetic material for high-density recording.

EXAMPLES

The present invention will now be described in more detail with reference to the following examples and comparative examples, but the present invention is not restricted to those examples and various modifications are possible within the scope of the invention.

The properties in the examples were measured by the following methods.

The major axial diameter and the aspect ratio of the cobalt-coated acicular magnetic iron oxide particles are expressed by the average values measured from electron microphotographs.

The specific surface area is expressed by the value measured by a BET method.

The magnetic characteristics of the particles such as coercive force and saturation magnetization and switching field distribution (S.F.D.) were measured under an external magnetic field of 10 kOe by "Vibration Sample Magnetometer VSM-3S-15" (manufactured by Toei Kogyo, Co., Ltd.).

As to a change of coercive force with temperature, the coercive force of the particles was measured at 25° C., 50° C. and 75° C. for the purpose of linear approximation, and the value obtained by dividing the gradient ($\delta Hc/\delta T$) by the coercive force at 25° C. (Hc(25° C.)) is expressed as the change of coercive force with temperature. The smaller the value, the more suppressed a change of coercive force with temperature.

Each of the Co content, P content and Si content of the cobalt-coated acicular magnetic iron oxide particles was measured in accordance with the general rule of fluorescent X-ray analysis, JIS K0119 by "Fluorescent X-ray analyzer Model 3063M" (manufactured by Rigaku Denki Kogyo Co., Ltd.).

The Mg content was measured by "Inductively Coupled Plasma Emission Spectrophotometer SPS4000" (manufactured by Seiko Instruments and Electronics, Ltd.).

The $Fe^{2+}$ content is expressed by the value measured by a oxidation-reduction measuring method.

Example 1

464 liter of aqueous ferrous sulfate containing 1.50 mol/liter of $Fe^{2+}$ and 228 liter of 2.7-N aqueous sodium hydroxide (corresponding to 0.42 equivalent based on the ferrous iron in the aqueous ferrous sulfate) were mixed and aqueous ferrous sulfate containing ferrous sulfate colloids having a pH of 6.8 was produced at 40° C.

Air was passed into the aqueous solution at 40° C. at a rate of 800 liter/minute for 6.8 hours to produce acicular goethite seed crystal particles. 208 liter of 7.0-N aqueous sodium carbonate was added to the aqueous ferrous sulfate containing the seed crystal particles obtained, and air was passed into the aqueous solution having a pH of 8.9 at 50° C. at a rate of 800 liter/minute for 2.0 hours to produce acicular goethite particles.

16 kg of a paste of the acicular goethite particles obtained (equivalent to 5.0 kg of acicular goethite particles) having an average major axial diameter of 0.56 $\mu$m, an aspect ratio (major axial diameter/minor axial diameter) of 12 and a BET specific surface area of 76 $m^2$/g was charged into 90 liter of water to prepare an aqueous suspension. The pH of the suspension was 7.5. Then, 750 ml of an aqueous solution containing 237 g of sodium hexameta-phosphite (equivalent to 0.45 wt % as P based on the acicular goethite particles) was added to the suspension, and after the suspension was stirred for 30 minutes, it was filtered and dried so as to obtain the acicular goethite particles coated with a phosphorus compound.

The acicular goethite particles obtained was heat-treated at 350° C. in the air to obtain acicular hematite particles coated with a phosphorus compound.

1 kg of the acicular hematite particles coated with a phosphorus compound was charged into a retort reducing vessel, and hydrogen gas was passed into the vessel at a rate of 2 liter/minute while the vessel was rotated. The acicular hematite particles were reduced at 330° C. to obtain acicular magnetite particles containing phosphorus.

An aqueous suspension was obtained by dispersing 800 g of the acicular magnetite particles containing phosphorus (average major axial diameter: 0.20 $\mu$m, aspect ratio (major axial diameter/minor axial diameter): 7.0, BET specific surface area: 35.8 $m^2$/g, coercive force: 395 Oe, saturation magnetization: 83.0 emu/g, phosphorus content: 0.52 wt % (calculated as P) ) into 10.0 liter of water. 1.56 liter of aqueous NaOH solution of 10 mol/liter was added. The temperature of the suspension was raised to 40° C.

After 668 ml of aqueous solution of $FeSO_4$ of 1.5 mol/liter (Fe content is equivalent to 7.0 wt % based on the acicular magnetite particles) was added to the suspension, 345 ml of aqueous solution of $CoSO_4$ of 1.3 mol/liter (Co content is equivalent to 3.3 wt % based on the acicular magnetite particles) was added in one minute. Thereafter, the suspension was continued to stir for 30 minutes. The temperature of the suspension was then raised to 100° C., and the temperature was maintained at 100° C. for 30 minutes while the suspension was stirred. Thus, the acicular magnetite particles were coated with spinel ferrite.

Figure 1:
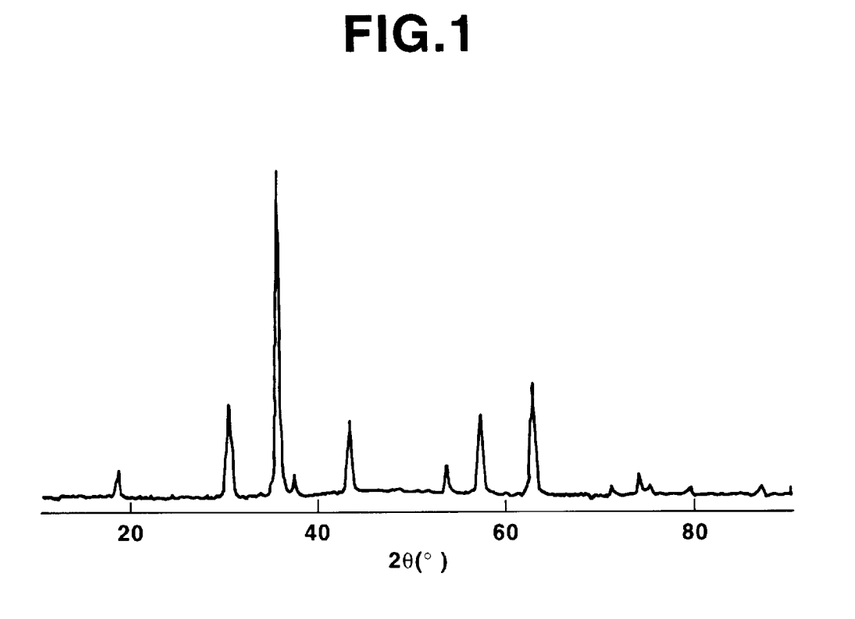
FIG. 1 shows a pattern obtained by the X-ray diffraction of acicular magnetite particles before being coated with spinel ferrite layer containing cobalt in an embodiment of the present invention.
Figure 2:
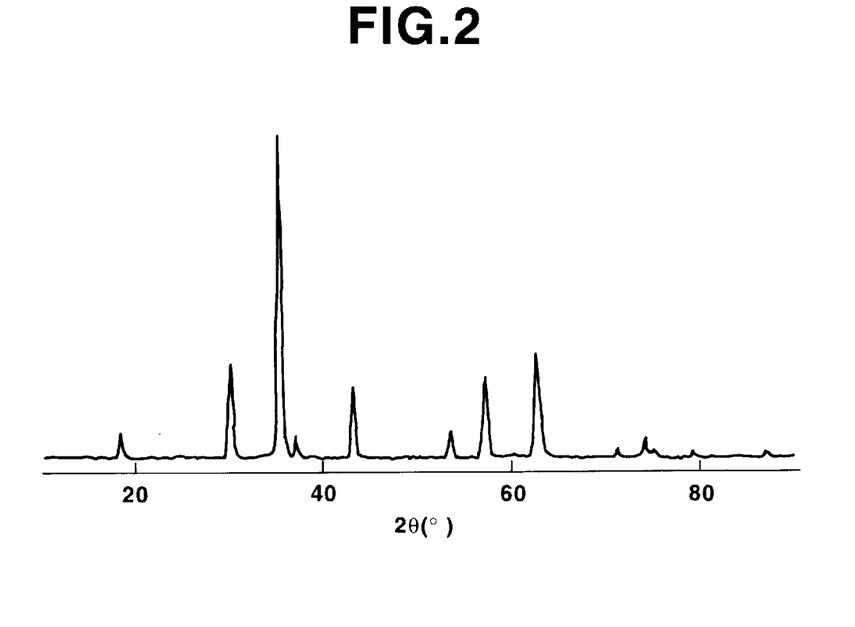
FIG. 2 shows a pattern obtained by the X-ray diffraction of magnetite particles coated with spinel ferrite layers containing cobalt in an embodiment of the present invention.

FIG. 1 shows a pattern obtained by the X-ray diffraction of the acicular magnetite particles before the cobalt coating reaction and FIG. 2 shows a pattern after the cobalt coating reaction. The X-ray diffraction measurement was carried out by using "X-ray diffractometer RAD-2A" (manufactured by Rigaku Denki Co., Ltd.). The patterns in FIGS. 1 and 2 were compared. Since no diffraction peak other than the one showing a spinel structure was observed, it was found that a coating layer composed of spinel ferrite containing cobalt was formed on the particles surface.

The temperature of the alkaline aqueous suspension containing the magnetite particles coated with spinel ferrite layers obtained (solid content: 50 g/liter) was raised to 60° C. 82.3 ml of aqueous magnesium sulfate of 2.0 mol/liter (equivalent to 0.50 wt % as Mg based on the seed crystal particles) was added to the aqueous suspension, and the suspension was continued to stir for 10 minutes so that the system became uniform. The suspension was washed with water until the pH became 10.0 while maintaining the temperature at 60° C., and as a result of filtering and drying, magnetite particles having coating layers composed of spinel ferrite containing cobalt as inner layers and coating layers composed of a hydroxide of magnesium as outer layers were obtained.

Figure 3:
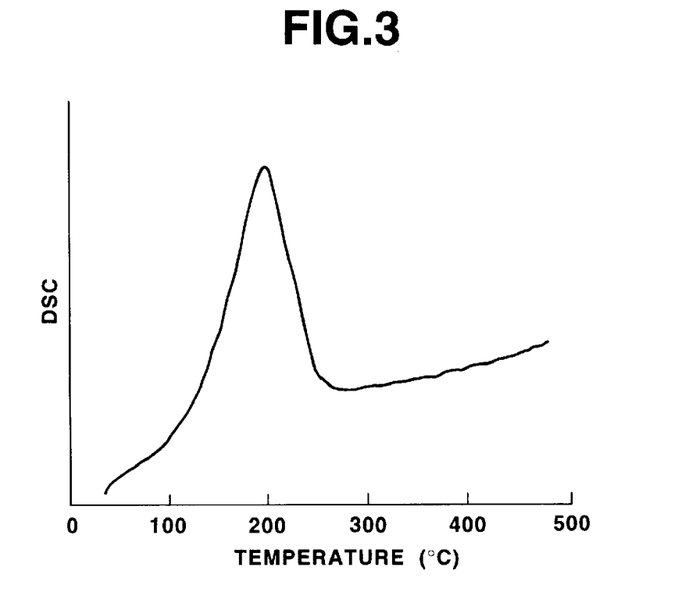
FIG. 3 shows a temperature change of differential scanning calory (DSC) of magnetite particles coated with spinel ferrite layers containing cobalt in an embodiment of the present invention.
Figure 4:
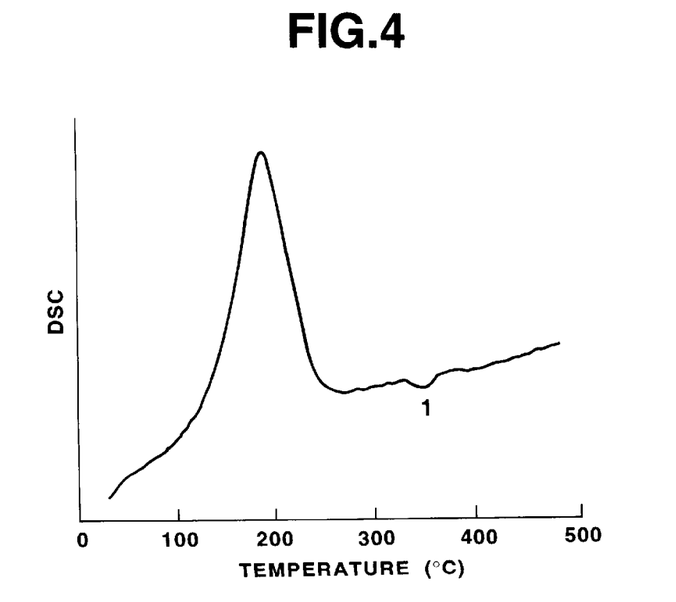
FIG. 4 shows a temperature change of differential scanning calory (DSC) of magnetite particles coated with spinel ferrite layers containing cobalt as inner layers and coated with a hydroxide of magnesium as outer layers in an embodiment of the present invention.

FIGS. 3 and 4 show a change of differential scanning calory (DSC) of the magnetite particles before and after the treatment, respectively. The differential scanning calory (DSC) was measured by "Thermal Analyzer SSC5000 (manufactured by Seiko Instruments and Electronics, Ltd.). Since endocermic peak 1 caused by magnesium hydroxide was shown in the vicinity of 330° C., it was proved that a coating layer composed of a hydroxide of magnesium was formed as an outer layer.

The cobalt-coated acicular magnetic iron oxide particles obtained had an average major axial diameter of 0.21 μm, an aspect ratio (major axial diameter/minor axial diameter) of 6.0, a coercive force of 945 Oe, and a saturation magnetization of 82.5 emu/g. Various other properties are shown in Table 2.

A magnetic tape was produced the following manner.

A magnetic coating material was prepared by charging the thus-obtained cobalt-coated acicular magnetic iron oxide particles, a resin and a solvent described below into a 140-cc glass bottle in the following ratio, and mixing the charged material by a paint conditioner for 2 hours. The obtained magnetic coating material was applied to the polyethylene terephthalate film (thickness: 25 μm) to a thickness of 40 μm by an applicator, and the obtained film was then oriented and dried in a magnetic field 1450 Gauss.

| | |
|---|---|
| Grass beads of 1.5 mm in diameter | 100 g |
| Cobalt-coated acicular magnetic iron oxide particles | 15 g |
| Toluene | 5.6 g |
| Phosphate ester (GAFAC RE-610, produced by Toho Chemical Industries Co., Ltd. | 0.6 g |
| Lecithin | 0.6 g |
| Vinyl chloride-vinyl acetate copolymer (Vinilite VAGH, produced by Union Carbide Corp. | 3.75 g |
| Butadiene acrylonitrile rubber (Hycar 1432 J, produced by Japan Geon Co., Ltd. | 0.75 g |
| Mixed solution of methyl isobutyl ketone, methyl ethyl ketone and toluene (3:1:1) | 40.5 g |

Examples 2 to 8, Comparative Examples 1 to 7

Cobalt-coated acicular magnetic iron oxide particles were produced in the same way as in Example 1 except for varying addition or non-addition of P and Si, the amounts of P and Si added, the kinds of acicular magnetic iron oxide particles used for the cobalt coating reaction, the amounts of aqueous ferrous salt solution and aqueous cobalt salt added in the cobalt coating reaction, and the amount of magnesium salt added for the formation of a magnesium hydroxide layer. The conditions for producing the cobalt-coated acicular magnetic iron oxide particles are shown in Table 1 and various properties of cobalt-coated acicular magnetic iron oxide particles obtained are shown in Table 2.

TABLE 1

Conditions for producing cobalt-coated acicular magnetic iron oxide particles

| | Addition of P | | | Acicular magnetic iron oxide particles | |
|---|---|---|---|---|---|
| | | Phosphate or silicate | | | Major axial |
| | Particles treated | Type | Amount (wt %) | Type | diameter (nm) |
| Ex. 1 | Acicular goethite particles | Na hexametaphosphate | 0.45 | Acicular magnetite particles | 0.20 |
| Ex. 2 | Acicular goethite particles | Na hexametaphosphate | 0.40 | Acicular magnetite particles | 0.24 |
| Ex. 3 | Acicular goethite particles | Na hexametaphosphate | 0.40 | Acicular magnetite particles | 0.20 |
| Ex. 4 | Acicular goethite particles | Na hexametaphosphate | 0.45 | Acicular magnetite particles | 0.20 |
| Ex. 5 | Acicular goethite particles | Na hexametaphosphate | 0.17 | Acicular maghemite particles | 0.20 |
| Ex. 6 | Acicular goethite particles | Na hexametaphosphate | 0.80 | Acicular maghemite particles | 0.13 |
| Ex. 7 | Acicular goethite particles | Na hexametaphosphate Water glass | 0.40 0.11 | Acicular magnetite particles | 0.20 |
| Ex. 8 | Acicular goethite particles | Na hexametaphosphate Water glass | 0.40 0.20 | Acicular magnetite particles | 0.24 |
| Comp. Ex. 1 | — | — | — | Acicular magnetite particles | 0.24 |
| Comp. Ex. 2 | Acicular goethite particles | Na hexametaphosphate | 0.45 | Acicular magnetite particles | 0.24 |
| Comp. Ex. 3 | — | — | — | Acicular magnetite particles | 0.22 |
| Comp. Ex. 4 | — | — | — | Acicular magnetite particles | 0.26 |
| Comp. Ex. 5 | Acicular goethite particles | Na hexametaphosphate | 0.40 | Acicular magnetite particles | 0.27 |
| Comp. Ex. 6 | — | — | — | Acicular magnetite particles | 0.26 |
| Comp. Ex. 7 | Acicular goethite particles | Na hexametaphosphate | 0.45 | Acicular magnetite particles | 0.22 |

| | Acicular magnetic iron oxide particles | | | | | Co-coating |
|---|---|---|---|---|---|---|
| | Aspect ratio | BET specific surface area (m²/g) | P content (wt %) | SI content (wt %) | Coercive force Hc (Oe) | Saturation magnetization (σs) (emu/g) | OH concentration (mol/l) |
| Ex. 1 | 7.0 | 35.8 | 0.52 | — | 395 | 83.0 | 2.0 |
| Ex. 2 | 7.0 | 32.3 | 0.46 | — | 408 | 83.9 | 1.0 |
| Ex. 3 | 7.0 | 35.4 | 0.46 | — | 397 | 83.0 | 1.5 |
| Ex. 4 | 7.0 | 35.8 | 0.52 | — | 395 | 83.0 | 2.5 |
| Ex. 5 | 8.0 | 36.9 | 0.20 | — | 371 | 74.1 | 2.0 |
| Ex. 6 | 5.5 | 48.0 | 0.92 | — | 361 | 81.5 | 2.0 |
| Ex. 7 | 7.0 | 37.5 | 0.44 | 0.14 | 390 | 81.9 | 2.0 |
| Ex. 8 | 7.3 | 33.8 | 0.45 | 0.25 | 400 | 83.2 | 1.0 |
| Comp Ex. 1 | 7.0 | 33.1 | — | — | 365 | 80.6 | 2.0 |
| Comp Ex. 2 | 7.0 | 35.6 | 0.51 | — | 395 | 83.0 | 2.0 |

TABLE 1-continued

Conditions for producing cobalt-coated acicular magnetic iron oxide particles

| | | | | | | | |
|---|---|---|---|---|---|---|---|
| Comp Ex. 3 | 7.0 | 33.3 | — | — | 365 | 80.6 | 2.0 |
| Comp Ex. 4 | 7.0 | 31.3 | — | — | 370 | 81.0 | 1.0 |
| Comp Ex. 5 | 7.0 | 31.7 | 0.46 | — | 408 | 83.9 | 1.5 |
| Comp Ex. 6 | 7.0 | 30.1 | — | — | 370 | 81.0 | 1.0 |
| Comp. Ex. 7 | 6.5 | 36.2 | 0.52 | — | 395 | 83.0 | 2.0 |

| | Co coating | | Addition of Mg | | |
|---|---|---|---|---|---|
| | Amount of Co added (wt %) | Amount of Fe$^{+2}$ added (wt %) | Initial pH | Magnesium salt Type | Mg content (wt %) | Final pH |

| | Amount of Co added (wt %) | Amount of Fe$^{+2}$ added (wt %) | Initial pH | Type | Mg content (wt %) | Final pH |
|---|---|---|---|---|---|---|
| Ex. 1 | 3.3 | 7.0 | 14 | Magnesium sulfate | 0.50 | 10.0 |
| Ex. 2 | 1.8 | 7.0 | 14 | Magnesium sulfate | 0.50 | 10.5 |
| Ex. 3 | 2.1 | 5.0 | 14 | Magnesium sulfate | 0.40 | 10.5 |
| Ex. 4 | 3.5 | 8.0 | 14 | Magnesium sulfate | 0.50 | 10.5 |
| Ex. 5 | 2.7 | 9.8 | 14 | Magnesium sulfate | 0.35 | 10.5 |
| Ex. 6 | 3.4 | 6.0 | 14 | Magnesium sulfate | 0.40 | 10.5 |
| Ex. 7 | 3.0 | 7.0 | 14 | Magnesium sulfate | 0.50 | 10.5 |
| Ex. 8 | 2.0 | 7.0 | 14 | Magnesium sulfate | 0.50 | 10.5 |
| Comp. Ex. 1 | 3.5 | 7.0 | 14 | Magnesium sulfate | 0.55 | 10.5 |
| Comp. Ex. 2 | 3.7 | 7.0 | — | — | — | — |
| Comp. Ex. 3 | 4.0 | 7.0 | — | — | — | — |
| Comp. Ex. 4 | 2.0 | 7.0 | 14 | Magnesium sulfate | 0.50 | 10.5 |
| Comp. Ex. 5 | 2.3 | 7.0 | — | — | — | — |
| Comp. Ex. 6 | 2.9 | 7.0 | — | — | — | — |
| Comp. Ex. 7 | 3.3 | 7.0 | — | — | — | — |

TABLE 2

Properties of cobalt-coated acicular magnetic iron oxide particles

| | Major axial diameter (μm) | Minor axial diameter (μm) | Aspect ratio | BET specific surface area (m²/g) | Co content (atm %) | P content (atm %) | Si content (atm %) |
|---|---|---|---|---|---|---|---|
| Ex. 1 | 0.21 | 0.035 | 6.0 | 34.1 | 2.85 | 0.30 | — |
| Ex. 2 | 0.24 | 0.037 | 6.5 | 31.5 | 1.52 | 0.27 | — |
| Ex. 3 | 0.20 | 0.031 | 6.5 | 34.5 | 1.84 | 0.20 | — |
| Ex. 4 | 0.20 | 0.033 | 6.0 | 35.0 | 2.97 | 0.21 | — |
| Ex. 5 | 0.21 | 0.035 | 6.0 | 34.6 | 2.39 | 0.10 | — |
| Ex. 6 | 0.15 | 0.030 | 5.0 | 43.0 | 2.89 | 0.45 | — |
| Ex. 7 | 0.20 | 0.033 | 6.2 | 36.0 | 2.67 | 0.25 | 0.13 |
| Ex. 8 | 0.24 | 0.036 | 6.7 | 33.0 | 1.75 | 0.26 | 0.22 |
| Comp. Ex. 1 | 0.20 | 0.040 | 5.0 | 32.0 | 2.97 | — | — |
| Comp. Ex. 2 | 0.21 | 0.035 | 6.0 | 34.5 | 3.16 | 0.23 | — |
| Comp. Ex. 3 | 0.19 | 0.040 | 4.75 | 32.0 | 3.45 | — | — |
| Comp. Ex. 4 | 0.22 | 0.035 | 6.2 | 30.0 | 1.79 | — | — |
| Comp. Ex. 5 | 0.24 | 0.036 | 6.5 | 30.8 | 2.17 | 0.25 | — |
| Comp. Ex. 6 | 0.22 | 0.040 | 5.5 | 28.9 | 2.45 | — | — |
| Comp. Ex. 7 | 0.20 | 0.030 | 6.7 | 34.8 | 2.80 | 0.25 | — |

Properties of cobalt-coated acicular magnetic iron oxide particles

| | Mg content (atm %) | Coercive force Hc (Oe) | Saturation magnetization σs (emu/g) | δHc/δT · Hc (10$^{-3}$) | Square ratio Br/Bm | SFD |
|---|---|---|---|---|---|---|
| Ex. 1 | 0.23 | 945 | 82.5 | −2.82 | 0.77 | 0.425 |
| Ex. 2 | 0.25 | 702 | 83.0 | −2.65 | 0.79 | 0.434 |
| Ex. 3 | 0.28 | 705 | 82.3 | −2.61 | 0.80 | 0.430 |
| Ex. 4 | 0.31 | 945 | 82.5 | −2.89 | 0.76 | 0.444 |
| Ex. 5 | 0.13 | 700 | 77.8 | −2.63 | 0.78 | 0.410 |
| Ex. 6 | 0.23 | 950 | 76.4 | −2.84 | 0.75 | 0.440 |
| Ex. 7 | 0.33 | 850 | 81.7 | −2.78 | 0.81 | 0.428 |
| Ex. 8 | 0.25 | 730 | 82.7 | −2.66 | 0.80 | 0.430 |
| Comp. Ex. 1 | 0.31 | 946 | 80.0 | −3.00 | 0.74 | 0.535 |
| Comp. Ex. 2 | — | 944 | 82.6 | −3.18 | 0.76 | 0.475 |
| Comp. Ex. 3 | — | 940 | 79.6 | −3.30 | 0.74 | 0.573 |
| Comp Ex. 4 | 0.15 | 674 | 80.5 | −2.94 | 0.77 | 0.513 |
| Comp Ex. 5 | — | 696 | 83.2 | −2.95 | 0.79 | 0.480 |
| Comp. Ex. 6 | — | 675 | 80.5 | −3.23 | 0.76 | 0.550 |
| Comp. Ex. 7 | — | 860 | 82.5 | −3.13 | 0.76 | 0.489 |

What is claimed is:

1. Cobalt-coated acicular magnetic iron oxide particles having an average major axial diameter of 0.15 to 0.50 μm, comprising:

as seed crystal particles, acicular magnetic iron oxide particles containing 0.05 to 1.0 wt % of phosphorus, calculated as P, based on the weight of the cobalt-coated acicular magnetic iron oxide particles;

as inner layers, spinet ferrite layers containing cobalt formed on the surfaces of said seed crystal particles; and as outer layers, coating layers comprising a hydroxide of magnesium formed on said spinel ferrite layers in which the magnesium content of the outer coating layers is at least 0.01%, calculated as Mg, based on the weight of the cobalt-coated acicular magnetic iron oxide particles.

2. Cobalt-coated acicular magnetic iron oxide particles according to claim 1, wherein said seed crystal particles further contain 0.05 to 1.0 wt % of an oxide of silicon, calculated as Si, based on the weight of the cobalt-coated acicular magnetic iron oxide particles.

3. Cobalt-coated acicular magnetic iron oxide particles according to claim 1, wherein the aspect ratio is not less than 5 and the specific surface area is 25 to 50 m²/g.

4. Cobalt-coated acicular magnetic iron oxide particles according to claim 1, wherein the Co content of said inner layers is 1.0 to 10.0 wt %, calculated as Co, based on the weight of the cobalt-coated acicular magnetic iron particles.

5. Cobalt-coated acicular magnetic iron oxide particles according to claim 1, wherein the Mg content of outer layers is at most 1.0 wt %, calculated as Mg, based on the weight of the cobalt-coated acicular magnetic iron oxide particles.

6. Cobalt-coated acicular magnetic iron oxide particles according to claim 1, wherein the coercive force at 25° C. is 605 to 1600 Oe, the saturation magnetization is 77 to 90 emu/g, a change of coercive force with temperature is $-2.92 \times 10 \, 10^{-3}$ to $0/°$ C., and the switching field distribution is not more than 0.46.

* * * * *